US008536109B2

(12) United States Patent
Delbrassinne et al.

(10) Patent No.: US 8,536,109 B2
(45) Date of Patent: Sep. 17, 2013

(54) FOAM CONTROL COMPOSITION

(75) Inventors: Pascal Delbrassinne, Rixensart (BE); Jacqueline L'Hostis, Silly (BE); Jianren Zeng, Chiba (JP)

(73) Assignees: Dow Corning Corporation, Midland, MI (US); Dow Corning Toray Co., Ltd., Chiyoda-Ku, Tokyo (JP)

( * ) Notice: Subject to any disclaimer, the term of this patent is extended or adjusted under 35 U.S.C. 154(b) by 186 days.

(21) Appl. No.: 13/147,947

(22) PCT Filed: Feb. 3, 2010

(86) PCT No.: PCT/US2010/022985
§ 371 (c)(1), (2), (4) Date: Aug. 4, 2011

(87) PCT Pub. No.: WO2010/091044
PCT Pub. Date: Aug. 12, 2010

(65) Prior Publication Data

US 2011/0294714 A1 Dec. 1, 2011

(30) Foreign Application Priority Data

Feb. 4, 2009 (GB) .................................. 0901662.7

(51) Int. Cl.
*C11D 9/36* (2006.01)

(52) U.S. Cl.
USPC ........... 510/347; 510/222; 510/228; 510/317; 510/343; 510/466

(58) Field of Classification Search
USPC .................. 510/222, 228, 317, 343, 347, 466
See application file for complete search history.

(56) References Cited

U.S. PATENT DOCUMENTS

| | | | | |
|---|---|---|---|---|
| 3,865,544 | A | 2/1975 | Keil et al. | |
| 4,741,861 | A | 5/1988 | Okada et al. | |
| 4,853,474 | A | 8/1989 | Bahr et al. | |
| 5,136,068 | A | 8/1992 | Bahr et al. | |
| 6,512,015 | B1 | 1/2003 | Elms et al. | |
| 6,521,586 | B1 * | 2/2003 | Hoogland et al. | 510/466 |
| 6,605,183 | B1 | 8/2003 | Rautschek et al. | |
| 6,894,017 | B2 | 5/2005 | Brouwn et al. | |
| 7,105,581 | B2 | 9/2006 | Burger et al. | |
| 2002/0198127 | A1 | 12/2002 | Adriaanse et al. | |
| 2003/0013808 | A1 * | 1/2003 | Tonge et al. | 525/100 |
| 2005/0009721 | A1 | 1/2005 | Delplancke et al. | |
| 2005/0043200 | A1 | 2/2005 | Barry et al. | |
| 2005/0043205 | A1 | 2/2005 | Bettiol et al. | |
| 2005/0119151 | A1 | 6/2005 | Mayer et al. | |
| 2005/0124528 | A1 | 6/2005 | Binder et al. | |
| 2005/0130859 | A1 | 6/2005 | Gupta et al. | |
| 2005/0130864 | A1 | 6/2005 | Ouwendijk-Vrijenhoek et al. | |

FOREIGN PATENT DOCUMENTS

| | | |
|---|---|---|
| DE | 102004 040263 | 2/2006 |
| EP | 0 663 225 | 11/1998 |
| EP | 1 075 864 | 2/2001 |
| EP | 1167502 | 4/2004 |
| EP | 1 528 954 | 5/2006 |
| EP | 1 075 863 | 7/2008 |
| WO | WO 2007/022866 | 3/2007 |

OTHER PUBLICATIONS

International Search Report, PCT/US2010/022985, dated Sep. 23, 2010, 4 pages.
Written Opinion, PCT/US2010/022985, dated Sep. 23, 2010, 5 pages.
"Liquid Detergents", Ed. Kuo-Yann Lai, Surfactant Sciences Series, vol. 67, Marcel Dekker Inc., 1997 (p. 261-324).

* cited by examiner

*Primary Examiner* — Charles Boyer
(74) *Attorney, Agent, or Firm* — Nixon Peabody LLP

(57) ABSTRACT

This invention relates to a foam control composition comprising: (A) a silicone antifoam comprising (i) an organopolysiloxane having at least one silicon-bonded substituent of the formula X—Ar, wherein X represents a divalent aliphatic group bonded to silicon through a carbon atom and Ar represents an aromatic group, (ii) an organosilicon resin having the formula $R^1{}_aSiO_{(4-a)/2}$ where $R^1$ represents a hydrocarbon, a hydrocarbonoxy or a hydroxyl group and a has an average value of 0.5 to 2.4, and (iii) a hydrophobic filler; and (B) an organopolysiloxane resin having at least one polyoxyalkylene group in which the organopolysiloxane resin comprises tetrafunctional siloxane units having the formula $SiO_{4/2}$ and monofunctional siloxane units having the formula $R^2{}_3SiO_{1/2}$, wherein the total number of tetrafunctional siloxane units in the resin is at least 50% based on the total number of siloxane units, and $R^2$ represents a hydrocarbon group. The foam control composition may be added to a potentially foaming liquid, particularly a detergent, such as an HDL detergent.

20 Claims, 1 Drawing Sheet

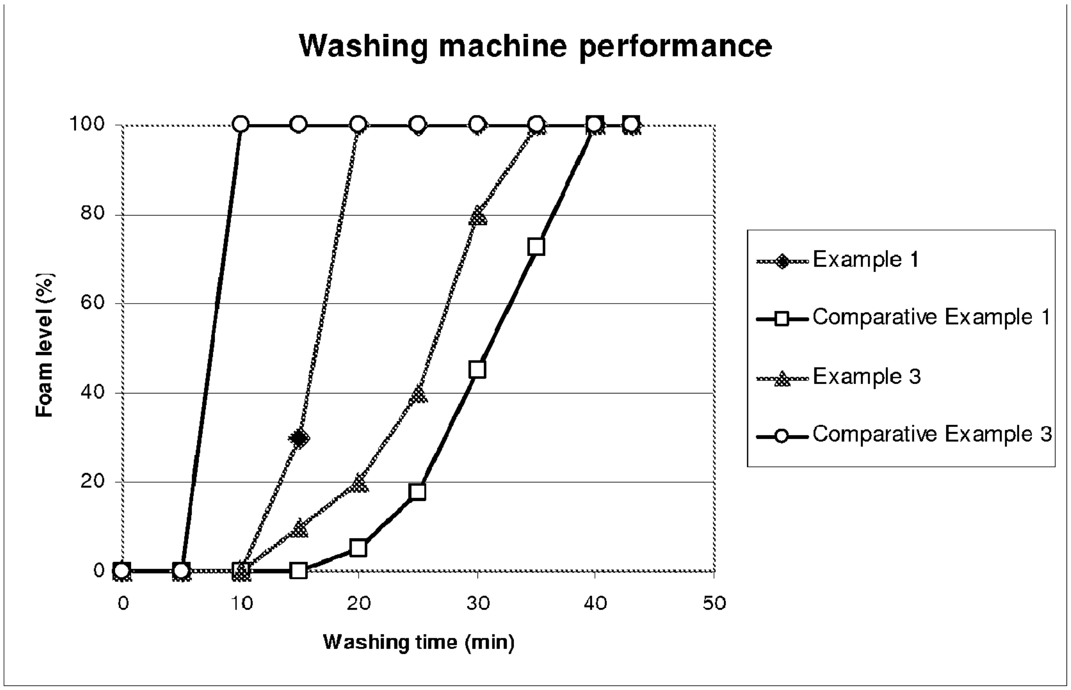
Washing machine performance
100
80
60
40
20
0
Foam level (%)
0
10
20
30
40
50
Washing time (min)
Example 1
Comparative Example 1
Example 3
Comparative Example 3

FOAM CONTROL COMPOSITION

CROSS REFERENCE TO RELATED APPLICATIONS

This application is a U.S. national stage of International Application No. PCT/US2010/022985, filed Feb. 3, 2010, which claims priority to Great Britain Application No. 0901662.7 filed on Feb. 4, 2009, which is incorporated herein in its entirety.

This invention relates to a foam control composition and particularly to a silicone foam composition for liquid detergent systems.

The stabilisation of a silicone foam control agent in a liquid detergent system is a challenge and to date no robust solutions have been identified which provide good physical and chemical stability across wide range of Heavy Duty Liquid (HDL) detergents.

It is known to use silicone-based surfactant delivery agents, like branched silicone glycols, in combination with polydimethyl siloxane (PDMS)-based antifoam agents to improve the stabilisation, but this approach provides liquid detergents which are not sufficiently robust and have unsatisfactory long-term stability leading to physical phase separation and/or to deterioration of the foam control performance.

A number of approaches have been proposed in the art to provide suitable foam control performance. EP 0 663 225 discloses a foam control composition comprising a silicone antifoam agent, such as PDMS, and a cross-linked organopolysiloxane polymer having at least one polyoxyalkylene group. The organopolysiloxane is based on a structure having monofunctional and difunctional siloxane units.

EP 1 075 863 and EP 1 075 864 disclose a foam control agent particularly for use with a detergent. The foam control agent comprises an organopolysiloxane material having at least one silicon-bonded substituent of the formula X—Ar, wherein X denotes a divalent aliphatic hydrocarbon group and Ar denotes an optionally substituted aromatic group, an organosilicon resin and a hydrophobic filler. The organosilicon resin preferably consists of siloxane units having the formula $R'_aSiO_{(4-a)/2}$ wherein R' represents a hydrocarbon, a hydrocarbonoxy or a hydroxyl group and has an average value of 0.5 to 2.4. The composition optionally includes the cross-linked organopolysiloxane polymer having at least one polyoxyalkylene group described in EP 0 663 225.

U.S. Pat. No. 3,865,544 discloses a different approach, combining a base oil, such as a polyglycol, a PDMS-type antifoam compound and copolymers consisting essentially of $SiO_{4/2}$ units, $(CH_3)_3SiO_{1/2}$ units and $Q(CH_3)_2SiO_{1/2}$ units, where Q is a polyoxypropylene polymer or a polyoxypropylene-polyoxyethylene copolymer radical having a molecular weight in the range of 500 to 6,000.

U.S. Pat. No. 6,512,015 discloses a composition comprising a PDMS-based antifoam compound, a mineral oil, a silicone polyether or branched silicone glycols and silica. Further examples of siloxane-based antifoam compositions are disclosed in U.S. Pat. No. 6,605,183 and U.S. Pat. No. 7,105,581.

However, there remains a need in the art for antifoam compositions which are able to provide more stable mixtures in various liquid detergents together with excellent foam control performance, whilst still being safe and inert with respect to the components in the detergent.

Accordingly, a foam control composition is provided comprising: (A) a silicone antifoam comprising (i) an organopolysiloxane having at least one silicon-bonded substituent of the formula X—Ar, wherein X represents a divalent aliphatic group bonded to silicon through a carbon atom and Ar represents an aromatic group, (ii) an organosilicon resin having the formula $R^1_aSiO_{(4-a)/2}$ where $R^1$ represents a hydrocarbon, a hydrocarbonoxy or a hydroxyl group and a has an average value of 0.5 to 2.4, and (iii) a hydrophobic filler; and (B) an organopolysiloxane resin having at least one polyoxyalkylene group in which the organopolysiloxane resin comprises tetrafunctional siloxane units having the formula $SiO_{4/2}$ and monofunctional siloxane units having the formula $R^2_3SiO_{1/2}$, wherein the total number of tetrafunctional siloxane units in the resin is at least 50% based on the total number of siloxane units, and $R^2$ represents a hydrocarbon group.

It has surprisingly been found that this particular composition provides a stable mixture in various liquid detergents and excellent foam control performance whilst providing only a very slight increase in the turbidity of the clear liquid detergents thus providing an aesthetically pleasing appearance.

The present invention will now be described with reference to the drawing, in which FIG. 1 shows a graphical representation of foam levels in an HDL detergent using embodiments of the antifoam composition of the present invention and certain comparative examples.

The foam control composition comprises (A) a silicone antifoam, (B) a silicone dispersion agent, optionally (C) a cross-linked organopolysiloxane polymer having at least one polyoxyalkylene group, and optionally (D) an organic oil.

Component (A), the silicone antifoam, comprises (i) an organopolysiloxane having at least one silicon-bonded substituent of the formula X—Ar, wherein X represents a divalent aliphatic group bonded to silicon through a carbon atom and Ar represents an aromatic group, (ii) an organosilicon resin having the formula $R^1_aSiO_{(4-a)/2}$ where $R^1$ represents a hydrocarbon, a hydrocarbonoxy or a hydroxyl group and a has an average value of 0.5 to 2.4, and (iii) a hydrophobic filler.

Component (A)(i) is an organopolysiloxane material having at least one silicon-bonded substituent of the formula X—Ar, wherein X represents a divalent aliphatic group bonded to silicon through a carbon atom and Ar represents an aromatic group. The organopolysiloxane material (A)(i) is preferably a fluid and is preferably a polydiorganosiloxane. The polydiorganosiloxane (A)(i) preferably comprises diorganosiloxane units of the formula

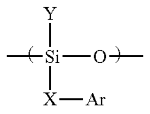

where Y is an alkyl group having 1 to 4 carbon atoms, preferably methyl. These diorganosiloxane units containing a —X—Ar group may comprise substantially all or a majority of the diorganosiloxane units in organopolysiloxane (A)(i), but preferably comprise up to 50 or 60%, most preferably 5 to 40%, of the diorganosiloxane units in (A)(i). The group X is preferably a divalent alkylene group having from 2 to 10 carbon atoms, most preferably 2 to 4 carbon atoms, but can alternatively contain an ether linkage between two alkylene groups or between an alkylene group and —Ar, or can contain an ester linkage. Ar is preferably a moiety containing at least one aromatic ring —$C_6E_5$, wherein each E independently represents hydrogen, halogen, hydroxyl, an alkoxy group having 1 to 6 carbon atoms or a monovalent hydrocarbon group having 1 to 12 carbon atoms, or wherein two or more E groups together represent a divalent hydrocarbon group. Ar is most preferably a phenyl group, but may be substituted for example by one or more methyl, methoxy, hydroxyl or chloro group, or two substituents E may together form a divalent alkylene group, or may together form an aromatic ring, resulting in conjunction with the Ar group in e.g. a naphthalene group. A particularly preferred X—Ar group is 2-phenylpropyl ($—CH_2—CH(CH_3)—C_6H_5$). Alternatively Ar can be a heterocyclic group of aromatic character, such as thiophene, pyridine or quinoxaline.

The polydiorganosiloxane (A)(i) also preferably comprises at least 50% diorganosiloxane units of the formula

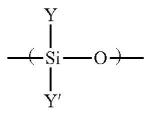

where Y' is a hydrocarbon group having 1 to 24 carbon atoms, preferably an aliphatic group of up to 6 carbon atoms, for example ethyl, propyl, isobutyl, methyl, hexyl or vinyl, or lauryl or a cycloalkyl group such as cyclohexylethyl. Mixtures of alkyl groups Y' can be used. It is believed that the enhanced foam control of the antifoam agents of the invention may involve interaction between the Ar groups of (A)(i) and the organosilicon resin (A)(ii), and the Ar groups may be more accessible if no long chain alkyl groups are present. Other groups can be present as Y', for example haloalkyl groups such as chloropropyl or acyloxyalkyl or alkoxyalkyl groups. At least some of the groups Y' can be phenyl groups or substituted phenyl groups such as tolyl; aromatic groups bonded direct to silicon are not equivalent to the groups-X—Ar but can be present as Y'.

The organopolysiloxane material (A)(i) may be prepared by any suitable method, but preferably is prepared by a hydrosilylation reaction between a siloxane polymer having a number of silicon-bonded hydrogen atoms with the appropriate amount of X"—Ar molecules, wherein X" is as described for X, but has aliphatic unsaturation in the terminal group, allowing addition reaction with the silicon-bonded hydrogen atoms of the siloxane polymer. Examples of suitable X"—Ar materials include styrene (which introduces 2-phenylethyl groups), α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4- or 2,5-dimethylstyrene or 2,4,6-trimethylstyrene. α-Methyl styrene introduces 2-phenylpropyl groups, which are believed to be mainly 2-phenyl-1-propyl groups but may include 2-phenyl-2-propyl groups. Mixtures of X"—Ar materials can be used, for example styrene with α-methyl styrene. Such hydrosilylation reaction is preferably carried out under conditions and in the presence of suitable catalysts as described, for example, in U.S. Pat. No. 4,741,861. A radical inhibitor is preferably present to prevent homopolymerisation of X"—Ar.

The organopolysiloxane material (A)(i) may be a substantially linear polydiorganosiloxane or may have some branching. The branching may be in the siloxane chain, brought about e.g. by the presence of some tri-functional siloxane units of the formula $ZSiO_{3/2}$, where Z represents a hydrocarbon, hydroxyl or hydrocarbonoxy group. Alternatively branching may be caused by a multivalent, e.g. divalent or trivalent, organic or silicon-organic moiety linking siloxane polymer chains. The organic moiety can be a divalent linking group of the formula —X'—, and the silicon-organic moiety can be a divalent linking group of the formula X'-Sx-X', where X' represents a divalent organic group bonded to silicon through a carbon atom and Sx is an organosiloxane group. Examples of organic linking (branching) units are $C_{2-6}$ alkylene groups, e.g. dimethylene or hexylene, or aralkylene groups of the formula-$X'—C_6H_4—X'$—. Hexylene units can be introduced by reaction of 1,5-hexadiene with Si—H groups and $—X'—C_6H_4—X'$-units by reaction of divinylbenzene or diisopropylbenzene. Examples of silicon-organic linking units are those of the formula-$(CH_2)_d—(Si(CH_3)_2—O)_e—Si(CH_3)_2—(CH_2)_d$—, wherein d has a value of from 2 to 6 and e has a value of from 1 to 10; for example linking units of the latter formula with d=2 and e=1 can be introduced by reaction of divinyltetramethyldisiloxane with Si—H groups.

After the hydrosilylation reaction with the aromatic compound X"—Ar and any required reaction with a branching agent, the residual Si—H groups of the organopolysiloxane can be reacted with an alkene such as ethylene, propylene, isobutylene or 1-hexene, preferably in the presence of a hydrosilylation catalyst, to introduce the groups Y'.

It is preferred that the number of siloxane units (DP or degree of polymerisation) in the average molecule of material (A)(i) is at least 5, more preferably from 10 to 5,000. Particularly preferred are materials (A)(i) with a DP of from 20 to 1000, more preferably 20 to 200. The end groups of the organopolysiloxane (A)(i) can be any of those conventionally present in siloxanes, for example trimethylsilyl end groups.

The organosilicon resin (A)(ii) is generally a non-linear siloxane resin and contains siloxane units of the formula $R^1_aSiO_{(4-a)/2}$ wherein $R^1$ represents a hydrocarbon, a hydrocarbonoxy or a hydroxyl group and wherein a has an average value of from 0.5 to 2.4. Hence component (A)(ii) is different from component (B). The resin preferably contains monovalent trihydrocarbonsiloxy (M) groups of the formula $R'_3SiO_{1/2}$ and tetrafunctional (Q) groups $SiO_{4/2}$ wherein R' represents a monovalent hydrocarbon group. The number ratio of M groups to Q groups is preferably in the range 0.4:1 to 2.5:1 (equivalent to a value of a in the formula $R'_aSiO_{(4-a)/2}$ of 0.86 to 2.15), and is more preferably 0.4:1 to 1.1:1 and most preferably 0.5:1 to 0.8:1 (equivalent to a=1.0-1.33) for use in laundry detergent applications. The organosilicon resin (A)(ii) is preferably a solid at room temperature, but MQ resins having a M/Q ratio of higher than 1.2, which are generally liquid, can be used successfully. Although it is most preferred that the resin (A)(ii) consists only of M and Q groups as defined above, a resin comprising M groups, trivalent $R'SiO_{3/2}$ (T) groups and Q groups can alternatively be used. The organosilicon resin (A)(ii) can also contain divalent units $R'_2SiO_{2/2}$, preferably at no more than 20% of all siloxane units present. The group $R^1$ (and R') is preferably an alkyl group having from 1 to 6 carbon atoms, most preferably methyl or ethyl, or phenyl. It is particularly preferred that at least 80%, and most preferably substantially all of the $R^1$/R' groups present are methyl groups. Other hydrocarbon groups may also be present, e.g. alkenyl groups having from 1 to 6 carbon atoms present for example as dimethylvinylsilyl units, preferably in small amounts, most preferably not exceeding 5% of all $R^1$/R' groups. Silicon bonded hydroxyl groups and/or alkoxy, e.g. methoxy, groups may also be present. However, the substituents do not include polyalkyloxy groups (as defined herein with respect to components (B) and (C).

Such organosilicon resins are well known. They can be made in solvent or in situ, e.g. by hydrolysis of certain silane materials. Particularly preferred is the hydrolysis and condensation in the presence of a solvent, e.g. xylene, of a precursor of the tetravalent siloxy unit (e.g. tetra-orthosilicate, tetraethyl orthosilicate, polyethyl silicate or sodium silicate) and a precursor of mono-valent trialkylsiloxy units (e.g. trimethylchlorosilane, trimethylethoxysilane, hexamethyldisiloxane or hexamethyldisilazane). The resulting MQ resin can if desired be further trimethylsilylated to react out residual Si—OH groups or can be heated in the presence of a base to cause self-condensation of the resin by elimination of Si—OH groups.

The organosilicon resin (A)(ii) is preferably present in the antifoam at 1-50% by weight based on the total weight of the antifoam (component (A)), particularly 2-30% and most preferably 4-15%.

The organosilicon resin (A)(ii) may be soluble or partly soluble in the organopolysiloxane (A)(i) when present in the above amounts. Solubility can be measured by observing a mixture of (A)(i) and (A)(ii) in an optical microscope. Enhanced foam control in detergent applications has been achieved both by compositions containing dissolved organosilicon resin (A)(ii) and by compositions containing dispersed particles of organosilicon resin (A)(ii). The factors affecting solubility of (A)(ii) in (A)(i) include the proportion of X—Ar groups in (A)(i) (more X—Ar groups increase solubility), the degree of branching in (A)(i), the nature of the groups Y and Y' in (A)(i) (long chain alkyl groups decrease solubility), the ratio of M to Q units in MO resin (A)(ii) (higher ratio of M groups to Q groups increases solubility) and the molecular weight of (A)(ii). The solubility of (A)(ii) in (A)(i) at ambient temperature (25° C.) can thus be from 0.01% by weight to 15%. It may be advantageous to use a mixture of a soluble resin (A)(ii) and an insoluble resin (A)(ii), for example a mixture of MQ resins having different M/Q ratios. If the organosilicon resin (A)(ii) is insoluble in organopolysiloxane (A)(i), the average particle size of resin (A)(ii), as measured when dispersed in liquid (A)(i), may for example be from 0.5 to 400 μm, preferably 2 to 50 μm. For industrial foam control applications, such as defoaming of black liquor in the paper and pulp industry, resins which are soluble in the siloxane copolymer, such as MQ resins having a high M/Q ratio, are usually preferred.

The resin (A)(ii) can be added into the foam control agent as a solution in a non-volatile solvent, for example an alcohol such as dodecanol or 2-butyl-octanol or an ester such as octyl stearate. The resin solution prepared in a volatile solvent, e.g. xylene, can be united with the non-volatile solvent and the volatile solvent may be removed by stripping or by other forms of separation. In most cases the non-volatile solvent can be left in the foam control agent. It is preferred that the resin (A)(ii) is dissolved in an equal amount of non-volatile solvent or less, more preferably no more than about half its weight of solvent. The resin (A)(ii) can alternatively be added in solution in a volatile solvent followed stripping off the solvent. If the resin (A)(ii) is added as a solution and is insoluble in organopolysiloxane material (A)(i), it will form solid particles with an acceptable particle size on mixing.

The resin (A)(ii) can alternatively be added into the foam control agent in the form of solid particles, for example spray dried particles. Spray dried MQ resins are available commercially, for example of average particle size 10 to 200 microns.

The level of insolubility of resin (A)(ii) in organopolysiloxane material (A)(i) may affect its particle size in the composition. The lower the solubility of the organosilicon resins in organopolysiloxane material (A)(i), the larger the particle size tends to be when the resin is mixed as a solution into (A)(i). Thus an organosilicon resin which is soluble at 1% by weight in organopolysiloxane material (A)(i) will tend to form smaller particles than a resin which is only soluble at 0.01% by weight. Organosilicon resins (A)(ii) which are partly soluble in organopolysiloxane material (A)(i), that is having a solubility of at least 0.1% by weight, are preferred.

The molecular weight of the resin (A)(ii) can be increased by condensation, for example by heating in the presence of a base. The base can for example be an aqueous or alcoholic solution of potassium hydroxide or sodium hydroxide, e.g. a solution in methanol or propanol. It has been found that for some detergents, foam control agents containing the lower molecular weight MQ resins are the most effective at reducing foam but those containing MQ resins of increased molecular weight are more consistent in giving the same reduced foam levels under different conditions, for example at different wash temperatures or in different washing machines. The MQ resins of increased molecular weight also have improved resistance to loss of performance over time when stored in contact with the detergent, for example as an emulsion in liquid detergent. The reaction between resin and base may be carried out in the presence of the silica, in which case there may be some reaction between the resin and the silica. The reaction with base can be carried out in the presence of the organopolysiloxane (A)(i) and/or in the presence of the non-volatile solvent and/or in the presence of a volatile solvent. The reaction with base may hydrolyse an ester non-volatile solvent such as octyl stearate but it has been found that this does not detract from the foam control performance.

The composition also contains a hydrophobic filler (A)(iii). Hydrophobic fillers for foam control agents are well known and may be such materials as silica, preferably with a surface area as measured by BET measurement of at least 50 $m^2/g$, titanium dioxide, ground quartz, aluminium oxides, aluminosilicates, organic waxes e.g. polyethylene waxes and microcrystalline waxes, zinc oxide, magnesium oxide, salts of aliphatic carboxylic acids, reaction products of isocyanates with certain materials, e.g. cyclohexylamine, or alkyl amides, e.g. ethylenebisstearamide or methylenebisstearamide. Mixtures of one or more of these are also acceptable.

Some of the fillers mentioned above are not hydrophobic in nature, but can be used if rendered hydrophobic. This could be performed either in situ (i.e. when dispersed in the organopolysiloxane material (A)(i), or by pre-treatment of the filler prior to mixing with material (A)(i). A preferred filler is silica which has been rendered hydrophobic. This may be carried out, for example, by treatment with a fatty acid, but is preferably achieved by the use of methyl substituted organosilicon materials. Suitable hydrophobing agents include polydimethylsiloxanes, dimethylsiloxane polymers which are end-blocked with silanol or silicon-bonded alkoxy groups, hexamethyldisilazane, hexamethyldisiloxane and organosilicon resins comprising monovalent groups $(CH_3)_3SiO_{1/2}$ and tetravalent groups $SiO_2$ in a ratio of from 0.5-1.1:1 (MQ resins). Hydrophobing is generally carried out at a temperature of at least 80° C. Similar MQ resins can be used as the organosilicon resin (A)(ii) and as the hydrophobing agent for silica filler (A)(iii).

Preferred silica materials are those which are prepared by heating, e.g. fumed silica, or by precipitation, although other types of silica such as those made by gel-formation are also acceptable. The silica filler may for example have an average particle size of from 0.5 to 50 μm, preferably 2 to 30 μm, most preferably from 5 to 25 μm. Such materials are well known and are commercially available, both in hydrophilic form and in hydrophobic form.

The amount of filler (A)(iii) in the foam control agent of the invention is preferably 0.5 to 50% by weight based on the total weight of the antifoam (component (A)), particularly from 1 to 15%, more preferably 1 to 15% and most preferably 2 to 8%. It is also preferred that the ratio of the weight of resin (A)(ii) to the weight of filler (A)(iii) is from 1:10 to 20:1, preferably 1:5 to 10:1 most preferably 1:2 to 6:1.

The silicone antifoam according to the present invention may be made in any convenient manner, but preferably are provided by mixing the different ingredients under shear. The amount of shear is preferably sufficient to provide good dispersion of components (A)(ii) and (A)(iii) in material (A)(i), but not so much that the particles (A)(ii) and/or (A)(iii) would be broken, thus possibly making them less effective, or re-exposing surfaces which are not hydrophobic. Where the filler (A)(iii) needs to be made hydrophobic in situ, the manufacturing process would include a heating stage, preferably under reduced pressure, in which the filler and the treating agent are mixed together in part or all of organopolysiloxane material (A)(i), possibly in the presence of a suitable catalyst, where required.

In a preferred embodiment, the foam control composition is substantially free of polydimethylsiloxane (or indeed all polydialkylsiloxanes), or contains less than 20% by weight polydimethylsiloxane (or all polydialkylsiloxanes), based on the total weight of the composition.

The foam control agent also contains (B) a silicone dispersion agent. Such agents are described, for example, in U.S. Pat. No. 3,865,544 (see column 3, line 43 to column 4, line 26). The silicone dispersion agent is an organopolysiloxane resin having at least one polyoxyalkylene group in which the organopolysiloxane resin comprises tetrafunctional siloxane units having the formula $SiO_{4/2}$ and monofunctional siloxane units having the formula $R^2{}_3SiO_{1/2}$, wherein the total number of tetrafunctional siloxane units in the resin is at least 50%, more preferably at least 70%, based on the total number of siloxane units, and $R^2$ represents a hydrocarbon group.

This component keeps the foam control agent (A) dispersed in the medium of the antifoam composition, such as the organic oil (D). Component (B) is an organopolysiloxane resin having at least one polyoxyalkylene group. The polyoxyalkylene group is attached to the silicon atom via a silicon-carbon bond. It is a pendant group to the polysiloxane backbone. The alkylene group may have from 1 to 4 carbon atoms, but is preferably ethylene or propylene. The resin is based on tetrafunctional siloxane units having the formula $SiO_{4/2}$ and monofunctional siloxane units which may be represented by the formulae $R^2{}_3SiO_{1/2}$ and $QR^2{}_2SiO_{1/2}$, wherein Q is a polyoxyalkylene group, e.g. a polyoxypropylene polymer radical or a polyoxypropylene-polyoxyethylene copolymer radical, preferably having molecular weights in the range of 500 to 6,000. Preferably the ratio of tetrafunctional siloxane units to monofunctional siloxane units is 1:0.4-1.2. $R^2$ represents a hydrocarbon group, preferably an alkyl group having 1 to 6 carbon atoms, and most preferably methyl. Difunctional and trifunctional siloxane units ($R^2{}_2SiO_{2/2}$ and $R^2SiO_{3/2}$, respectively) may also be included, but they are typically present at less than 10% for each unit. The total number of monofunctional siloxane units in the resin is preferably at least 20%, more preferably at least 30%, based on the total number of siloxane units.

The resin is preferably prepared by cohydrolysing and condensing a mixture of $R^2{}_3SiCl$, $HR^2{}_2SiCl$ and $SiCl_4$ and then coupling an allyloxy-terminated polyoxyalkylene polymer (e.g. polyoxypropylene polymer or polyoxypropylene-polyoxyethylene copolymer having molecular weights in the range of 500 to 6,000) thereto with the aid of a platinum catalyst. See U.S. Pat. No. 3,511,788, particularly Examples 5 to 6, for details.

The resin may also be obtained by reacting a resin containing the tetrafunctional siloxane units having the formula $SiO_{4/2}$ and monofunctional siloxane units having the formula $R^2{}_3SiO_{1/2}$ with a hydroxyl containing polyoxyalkylene polymer (as described hereinabove). The reaction is performed simply by heating a mixture of the two ingredients for about two hours at reflux, preferably in the presence of a siloxane condensation catalyst such as potassium hydroxide or tin octoate. While not wishing to be bound by theory, it is believed that the residual hydroxyl groups on the silicon atoms in the siloxane condense with the hydroxyl groups of the polyoxyalkylene polymer to form a silicon-oxygen-carbon bond between the two reactants.

Component (B) as prepared generally contains a solvent such as xylene or toluene. This component can be used as prepared or the solvent can be removed from the product before incorporation into the composition. Either way no difference in performance is known to occur. If the solvent is not removed before adding this component, one less processing step is involved and the final product is more economically produced. The composition of this invention can contain, therefore, from 0 to 10 percent by weight of a solvent.

The foam control agent preferably also contains (C) a cross-linked organopolysiloxane polymer having at least one polyoxyalkylene group, in which the cross-linked organopolysiloxane polymer comprises difunctional siloxane units having the formula $R^3{}_2SiO_{2/2}$ and optionally monofunctional siloxane units having the formula $R^3{}_3SiO_{1/2}$, wherein the total number of difunctional siloxane units is at least 60%, preferably at least 70%, based on the total number of siloxane units, and $R^3$ represents a hydrocarbon group. Such agents are described, for example, in EP 0 663 225 (see page 5, line 37 to page 10, line 40), U.S. Pat. No. 4,853,474 and U.S. Pat. No. 5,136,068. Trifunctional and tetrafunctional siloxane units ($R^3SiO_{3/2}$ and $SiO_{4/2}$, respectively) may also be included, but they are typically present at less than 10% for each unit. The total number of monofunctional siloxane units in the resin is preferably at least 0.5%, and preferably no more than 10%, more preferably no more than 2%, based on the total number of siloxane units.

Compounds suitable as component (C) include organopolysiloxane-polyoxyalkylene polymer molecules. They are cross-linked by nonhydrolysable bonds and are substantially free of internal hydrolysable bonds. The cross-linking provides a three-dimensional cross-linked structure in which at least two organopolysiloxane chains are bonded together through at least one bridge.

Component (C) may be obtained by preparing a cross-linked organopolysiloxane polymer and combining a polyoxyalkylene group therewith or by preparing a linear polyorganosiloxane having a polyoxyalkylene group combined therewith and cross-linking the same.

The cross-linking may be attained through a variety of mechanisms. Those skilled in the art will readily recognise the systems wherein the required components are mutually compatible to carry out the method of preparing component (C). By way of illustration, an extensive bibliography of siloxane polymer chemistry is provided in Siloxane Polymers, S. J. Clarson and J. A. Semlyen eds., PTR Prentice Hall, Englewood Cliffs, N.J., (1993).

It is preferred that the cross-linking bonds and the bonds to the organopolysiloxane-polyoxyalkylene molecules are not hydrolysable, and that the cross-linking bridge contains no hydrolysable bonds. It is recognised that similar emulsifiers wherein the polyoxyalkylene units are attached to the organopolysiloxane units via SiOC bonds are useful in applications not requiring extended stability under conditions where hydrolysis may occur. It is further recognised that such emulsifiers containing cross-links formed by SiOC bonds offer benefits of improved emulsion stability and consistency in such applications not requiring extended stability under conditions where hydrolysis may occur.

Preferably, the cross-linked siloxane polymer (C) is obtained by the addition reaction between the following components: (i) an organopolysiloxane having an Si—H group at each of its terminal groups and an organopolysiloxane having at least two allyl groups in the side chains of each molecules thereof, or (ii) more preferably, an organopolysiloxane having at least two Si—H groups in the side chains of each molecule thereof, and a polyorganopolysiloxane having each of its terminals blocked with an allyl group or a silanol group.

The preferred cross-linking radical is a vinyl terminated organosiloxane used in combination with a Si—H containing backbone. This organosiloxane bridge should not contain any reactive sites for the polyoxyalkylene moieties. An organosiloxane bridge cooperates with the siloxane backbones which it bridges to create a siloxane network at the interface of water and the silicone antifoam agent. This network is thought to be important in effecting the stabilising properties and characteristics of the present invention. The siloxane bridge works with other types of antifoams. Other bridge types may be more suitable for non-silicone antifoams (e.g. an alkane bridge for mineral oil based antifoams).

The exact number of organopolysiloxane-polyoxyalkylene polymer molecules which will be bridged together will vary within each compound. One limitation on such cross-linking is that the overall molecular weight must not become so great as to cause the material to form a gel system. The extent of cross-linking must thus also be regulated relative to the molecular weight of each individual polymer molecule being cross-linked since the overall molecular weight must also be maintained sufficiently low to avoid gelling. In controlling the cross-linking reaction there is also the possibility that some non-cross linked material will be present. Component (C) has fluidity, i.e. it is free flowing and preferably has a viscosity of 100 to 100,000 $mm^2/s$ at 25° C. Viscosity may be measured using a glass capillary viscometer at 25° C.

Component (C) preferably has the unit formula:

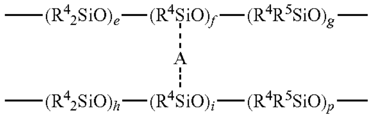

wherein $R^4$ is a monovalent hydrocarbon group, A is a cross-linker, preferably having a formula selected from $—(CH_2)_q—(R^6{}_2SiO)_rSi(CH_2)_s—$ or $—O(R^6{}_2SiO)_r—SiO—$ wherein $R^6$ represents a monovalent hydrocarbon group, q has a value of 2 to 10, r has a value of 1 to 5000, s has a value of 2 to 10, $R^5$ represents a polyoxyalkylene group, e.g. a polyoxypropylene polymer radical or a polyoxypropylene-polyoxyethylene copolymer radical, preferably having molecular weights in the range of 500 to 6,000, and preferably represents a group having a formula selected from:

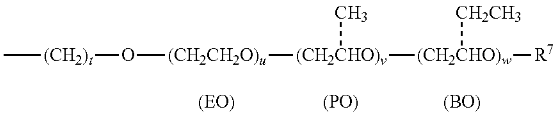

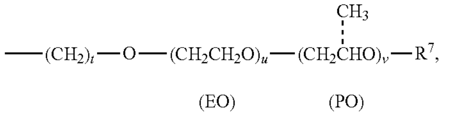

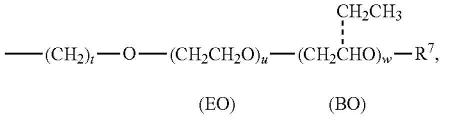

-continued

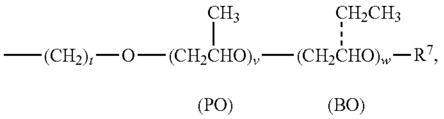

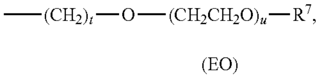

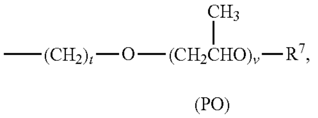 and

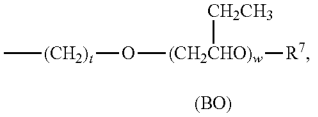

wherein $R^7$ is selected from a hydrogen atom, an alkyl group, an aryl group, or an acyl group, t has a value of 0 to 6, u has a value of from greater than zero (e.g. 1) to 150, v has a value of from greater than zero (e.g. 1) to 150, and w has a value of from greater than zero (e.g. 1) to 150, e has a value of 1 to 1000, f has a value of from greater than zero (e.g. 1) to 30, g has a value of 1 to 1000, h has a value of 1 to 1000, i has a value of from greater than zero (e.g. 1) to 30, p has a value of 1 to 1000. In the formula hereinabove EO, PO, and BO denote ethylene oxide, propylene oxide, and butylene oxide groups, respectively. The groups $R^4$ and $R^6$ can be the same or different as desired and are preferably alkyl groups or aryl groups and it is highly preferred that they are both methyl.

In the formulae hereinabove, it is preferred that e has a value of 1 to 500 and it is highly preferred that e has a value of 1 to 250, it is preferred that f has a value of from greater than zero (e.g. 1) to 20 and it is highly preferred that f has a value of from 1 to 15, it is preferred that g has a value of 1 to 100 and it is highly preferred that g has a value of 1 to 50, it is preferred that h has a value of 1 to 500 and it is highly preferred that h has a value of 1 to 250, it is preferred that i has a value of from greater than zero (e.g. 1) to 20 and it is highly preferred that i has a value of from greater than 1 to 15, it is preferred that p has a value of 1 to 100 and it is highly preferred that p has a value of 1 to 50, it is preferred that q has a value of 2 to 6, it is preferred that r has a value of 1 to 2500 and it is highly preferred that r has a value of 20 to 1000, it is preferred that s has a value of 2 to 6, it is preferred that t has a value of 0 to 3, it is preferred that u has a value of from 1 to 100 and it is highly preferred that u has a value of 5 to 50, it is preferred that v has a value of from 1 to 100 and it is highly preferred that v has a value of 5 to 50, it is preferred that w has a value of from 1 to 100 and it is highly preferred that w has a value of 1 to 50. It is preferred that the cross-linked organopolysiloxane polymer of component (C) is triorganosiloxy endblocked at each terminal of the polymer, and it is highly preferred that the polymer is trimethylsiloxy endblocked at each terminal of the cross-linked polymer.

A specific example of the method for producing the crosslinked organopolysiloxane polymers will now be described. Preparation of a crosslinked organopolysiloxane polymer was done through the following steps: (I) a charging step in which a linear polysiloxane having hydrogen atoms in its side chains, a polysiloxane having vinyl groups and a catalyst for promoting the reaction, particularly platinum catalysts such as an isopropanol solution of $H_2PtCl_66H_2O$ with a 2% methanol solution of sodium acetate are put in a reactor, (II) an agitation/heating step in which agitation is conducted, for example, at 40° C. for 30 minutes, (III) an input step in which a polyoxyalkylene and a solvent (isopropanol) are put in the reactor, (IV) a reflux step in which the isopropanol is refluxed, for example, at 80° C. for 1.5 to 2 hours while monitoring the reaction rate of Si—H, (V) a stripping step in which the isopropanol is stripped, for example, at 130° C. under a reduced pressure of 3.32 kPa (25 mmHg), and (VI) a final step in which the reduced pressure condition of step (V) is released and the reaction mixture is cooled to 60° C. to obtain a final product.

An example of a linear polysiloxane having hydrogen atoms in its side chains suitable for step (I) is a polysiloxane having its formula selected from:

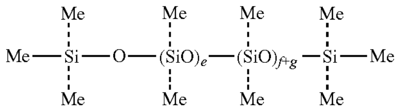 or

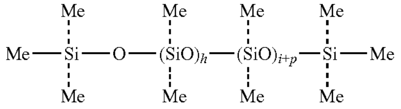

wherein Me hereinafter represents methyl and e, f, g, h, i, and p are as defined above. An example of a polysiloxane having vinyl groups suitable for step (I) is a polysiloxane having the formula:

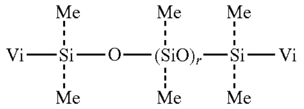

wherein Me represents methyl, Vi hereinafter represents vinyl, and r is as defined above. The reaction of these two compounds in step (II) results in a cross-linked siloxane polymer having the formula

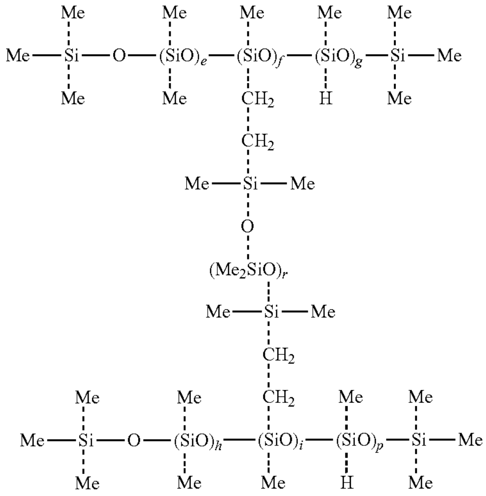

Introduction of a polyoxyalkylene group into the obtained crosslinked organopolysiloxane polymer (steps III-VI) is accomplished by reacting the crosslinked polymer with a polyoxyalkylene compound having its formula selected from $Vi\text{-}CH_2—O\text{-}(EO)_u—(PO)_v—(BO)_w—H$, $Vi\text{-}CH_2—O\text{-}(EO)_u—(PO)_v—H$, $Vi\text{-}CH_2—O\text{-}(EO)_u—(BO)_w—H$, $Vi\text{-}CH_2—O—(PO)_v—(BO)_w—H$, $Vi\text{-}CH_2—O\text{-}(EO)_u—H$, $Vi\text{-}CH_2—O—(BO)_w—H$ and $Vi\text{-}CH_2—O—(PO)_v—H$, wherein Vi, EO, PO, and BO are as denoted hereinabove, and u, v, and w are as defined above. The resulting compound was a cross-linked organopolysiloxane polymer having the formula

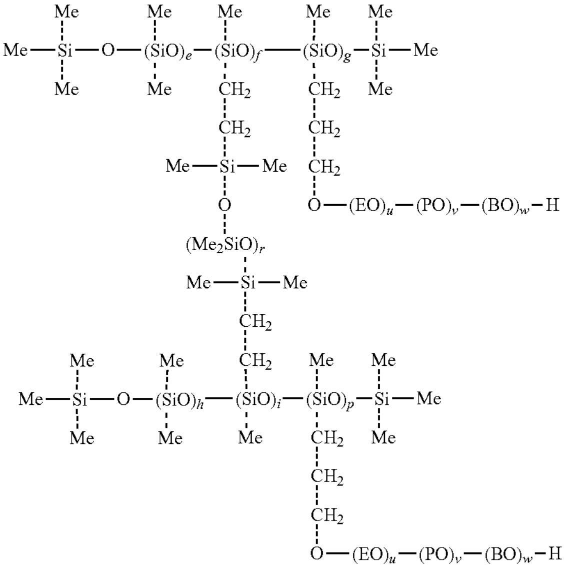

wherein Me, EO, PO, BO, e, f, g, h, i, p, and r are as defined hereinabove, u has a value of 0 to 150, v has a value of 0 to 150, and w has a value of 0 to 150, with the proviso that the value of u+v+w is at least one.

The foam control agent optionally includes an organic oil (D) which may be a single liquid or it may be a mixture of one or more such liquids. Suitable materials are described in EP 1 075 863. As an organic oil, it is typically water-insoluble. It preferably has an aromatic content of less than 10% by weight. It has to be a liquid material at the operating temperature of the foam control agent, which may be as high as 40° C. or even 95° C. For many uses, the organic fluid is preferably liquid at 25° C. Preferred organic liquids include oils, e.g. mineral oils, especially hydrogenated mineral oil or white oil, liquid polyisobutene, isoparaffinic oils and vegetable oils, for example peanut oil, coconut oil, olive oil, cottonseed oil and linseed oil. Further examples of suitable organic liquids include polypropylene glycols, polybutylene glycols, copolymers and blocked copolymers of polyethylene and polypropylene glycols, esters of carboxylic acids such as dioctyl phthalate, diethyl succinate, methyl caproate, butyl pelargonate, ethyl stearate, dodecyl laurate or methyl melissate and monohydric alcohols such as decanol. Examples of organic fluids which are not liquid at 25° C. but are liquid at higher temperatures include petroleum jelly or Vaseline®, higher alcohols and higher carboxylic acids such as myristic acid. Mixtures of the above-cited components may also be used.

The composition of the present invention is prepared by simply mixing the components together in the correct proportions. So far as is known at this time there is no particular order in which the components should or need be mixed. In a preferred embodiment, the composition comprises components (A), (B) and (C), and more preferably (A), (B), (C) and (D).

In the foam control composition comprising components (A) and (B) without components (C) or (D), the composition comprises 10-90% by weight of component (A) and 10-90% by weight of component (B); more preferably 30-60% by weight of component (A) and 30-60% by weight of component (B), based on the total weight of the foam control composition.

In the foam control composition comprising components (A), (B) and (C), but not component (D), the composition comprises 10-90% by weight of component (A), 0.1-90% by weight of component (B) and 0.1-50% by weight of component (C); more preferably 30-60% by weight of component (A), 30-50% by weight of component (B) and 30-50% by weight of component (C), based on the total weight of the foam control composition.

In composition comprising mixtures of components (A), (B) and (D), the composition comprises 10-90% by weight of component (A), 0.1-90% by weight of component (B) and 0.1-50% by weight of component (D); more preferably 30-60% by weight of component (A), 0.1-5% by weight of component (B) and 40-90% by weight of component (D), based on the total weight of the foam control composition.

In composition comprising mixtures of components (A), (B), (C) and (D), the composition comprises 10-90% by weight of component (A), 0.1-50% by weight of component (B), 0.1-50% by weight of component (C) and 0.1-90% by weight of component (D); more preferably 10-50% by weight of component (A), 0.1-5% by weight of component (B), 0.1-5% by weight of component (C) and 40-90% by weight of component (D), based on the total weight of the foam control composition.

The foam control composition of the present invention may also contain the following additional ingredients: a density adjuster; a colour preservative, such a maleate or fumarate, e.g. bis(2-methoxy-1-ethyl)maleate or diallyl maleate, an acetylenic alcohol, e.g. methyl butynol, cyclooctadiene, or cyclic methyl vinyl siloxane which reacts with any residual Pt catalyst present; an additional thickening agent, such as carboxymethyl cellulose or polyvinyl alcohol; a colouring agent such as a pigment or dye; or an organic waxy material, such as those described in EP 1 528 954.

The composition of the present invention is added in low concentrations (e.g. less than 1% by weight) to potentially foaming liquids to control the amount of foam produced. This removes unsightly and problematic surface foam which improves filtration, watering, washing and drainage of such liquids. Foam control agents have found application traditionally in such areas of use as the pulp and paper industry, paints and latex, coating processes, fertilisers, textiles, fermentation processes, metal working, adhesive, caulk and polymer manufacture, the sugar beet industry, oil well cement, cleaning compounds, detergents, cooling towers, and in chemical processes of varied description such as municipal and industrial primary and secondary waste water treatment. Accordingly, the present invention also provides the use of the composition defined herein for reducing or eliminating foam formation in a liquid. The composition of the present invention is particularly suited to Heavy Duty Liquid (HDL) detergents. Such detergents are well known in the art.

An HDL detergent is based on a formulation containing surfactants and water. The surfactants wet the surface of fabric and soil, help to lift the stains and stabilise dirt particles and oil droplets. The surfactants are typically an anionic surfactant which may be present at 5-20%, e.g. alkylbenzene sulfonate, and a nonionic surfactant which may be present at 5-30%, e.g. 7-EO ethoxylates. The detergent also contains a foam control agent and optionally a soap, which may be present at 5-20%. The detergent may optionally contain the following further ingredients: hydrotropes (e.g. salts of short chain benzene sulfonates, such as xylene-, cumene- or toluene-sulfonate); builders which sequester the hardness of water and disperse the dirt and soil particulates in the wash water (examples include Na citrate, Na salts of tartrate and mono- and di-succinate, STPP, silicates, carbonates, aluminosilicates and zeolites); alcohols (e.g. at 5-10%); enzymes and enzyme stabiliser (e.g. sodium formate and $CaCl_2$); cleaning aid (e.g. Borax and hydrogen peroxide); optical brighteners; fragrance; opacifiers and a base to adjust the pH (e.g. alkanolamine, such as triethanolamine). All percentages are by weight and are based on the total weight of the detergent, with the balance being water.

This typical HDL formulation may also be modified to a specialty liquid detergent for intended washing applications like woollens (anionic surfactants will be replaced by cationic surfactants), or colour care formulations including dye transfer inhibitors.

Further details may be found in “Liquid detergents”, Ed. Kuo-Yann Lai, Surfactant Sciences Serie Volume 67, Marcel Dekker Inc., 1997.

Examples of detergents which made be used with the foam control agent of the present invention are as follows. Unilever: “Liquid detergent composition” US 2005/0130864, “Liquid laundry detergent composition” US 2005/0130859, “Softening Laundry detergent” US 2005/0124528, “Liquid detergent compositions” U.S. Pat. No. 6,894,017 and “Liquid cleaning compositions and their use” US 2002/0198127; P&G: “Laundry and cleaning compositions” US 2005/0043205, “Aqueous liquid laundry detergent compositions with visible beds” US 2005/0043200 and “Liquid laundry detergent compositions” US 2005/0009721; and Henkel: “Textile cleaning agent which is gentle on textiles” US 2005/0119151.

The foam control composition is preferably added to the detergent at less than 5% by weight based on the total weight of the detergent and foam control composition combined. The amount of the foam control composition added to the detergent is preferably 0.01-0.5%, more preferably 0.03-0.25% and most preferably 0.05-0.1% by weight. The detergent is preferably an HDL detergent. The foam control composition is typically added to the potentially foaming liquid, such as the detergent, prior to use. The foam control composition is added and the liquid is stirred to disperse the foam control agent.

EXAMPLES

Example 1

A silicone antifoam agent was prepared by mixing the following components:

| | |
|---|---|
| 85% | polyorganosiloxane fluid |
| 4.5% | MQ resin in 2.2% octylstearate |
| 8% | hydrophobised silica (6% Sipernat ® D10 and 2% Aerosil ® R972 both from Evonik Industries) |

as described in Example 1 of EP 1 075 864 which explains that a foam control agent (FCA 1) was prepared by charging a 1 L flask equipped with a stirrer with 85 weight % of a copolymer (A) having a degree of polymerisation of 60 and comprising 80 mole % methyl ethyl siloxane groups, 20 mole % methyl α-methylstyrene siloxane groups and 1 mole % divinyl crosslinking groups, and 8% of a mixture of treated precipitated silica and fumed silica. The mixture was stirred until complete dispersion of the silica. Then 7% of an organosiloxane resin (B) having trimethyl siloxane units and $SiO_{4/2}$ units in a M/Q ratio of 0.65/1, dissolved in octyl stearate (70% solid), was added. The mixture was homogenised through a high shear mixer. The organosilicon resin (B) dissolved in the siloxane copolymer (A).

The resulting composition was designated "silicone antifoam 1". The antifoam composition was then prepared by combining the following ingredients:

| | |
|---|---|
| 30% | silicone antifoam 1 |
| 2% | crosslinked silicone polyether |
| 2% | MQ resin reacted with glycol |
| 24% | block copolymers based on ethylene oxide and propylene oxide having an average molecular weight of 3,000 to 5,000 and a HLB of 1 to 7, available as Pluronic ® from BASF |
| 43% | Polypropylene glycol P2000 available as Sannix ® PP-2000 or P-2000 from Sanyo Japan or Dow Chemicals. |

The crosslinked silicone polyether is a cross-linked polydiorganosiloxane polymer having at least one polyoxyalkylene group prepared by the method described in EP 0 663 225, as follows:

The polydiorganosiloxane was prepared by adding 12.8 parts of a linear polysiloxane having the formula $Me_3SiO-(Me_2SiO)_{108}-(MeHSiO)_{10}—SiMe_3$, 2.6 of a polysiloxane having the formula $ViMe_2SiO-(Me_2SiO)_1—SiMe_2Vi$ having a molecular weight of approximately 11,000 into a reactor, mixing, and heating to 80° C. Next, 0.001 parts of a 2% isopropanol solution of $H_2PtCl_6.6H_2O$ were added and the mixture was reacted for 60 minutes. 60.2 parts of a polyoxyalkylene having the formula $C_2H_4(EO)_u(PO)_vOH$ where the ratio of u:v is 1:1 and having a molecular weight of approximately 3,100 and 24.4 parts of isopropanol were then added. The mixture was heated to 90° C. and 0.001 additional parts of a 2% isopropanol solution of $H_2PtCl_6.6H_2O$ were added. The mixture was reacted at 90° C. for 2 hours, followed by a vacuum strip to remove the isopropanol. The mixture was cooled and filtered.

The MQ resin reacted with glycol is a copolymer which is the reaction products derived from heating a mixture of a siloxane copolymer consisting essentially of $SiO_{4/2}$ units and $(CH_3)_3SiO_{1/2}$ units in which the ratio of the $SiO_{4/2}$ units to the $(CH_3)_3SiO_{1/2}$ units is in the range of 1:0.4 to 1:1.2, and a hydroxylated polyoxypropylene polymer having molecular weights in the range of 500 to 6,000, The product is derived by heating for 30 minutes at reflux a mixture of 100 g. of a 50% (solids) xylene solution of a siloxane copolymer consisting essentially of $SiO_{4/2}$ units and $(CH_3)_3SiO_{1/2}$ units in which the ratio of the $SiO_{4/2}$ units to the $(CH_3)_3SiO_{1/2}$ units is in the range of 1:0.4 to 1:1.2, 100 g of xylene, 200 g. of a hydroxylated polyoxypropylene polymer having a molecular weight of about 4,100 (Voranol CP4100) in xylene, and 14 drops of a 1N alcoholic KOH solution.

Example 2

An antifoam composition was prepared in the same manner as described in Example 1, except that the silicone antifoam was replaced by silicone antifoam 2:

| | |
|---|---|
| 77% | polyorganosiloxane fluid |
| 13.3% | MQ resin in 6.6% octyl stearate |
| 2% | hydrophobised silica (Cab-o-sil ® TS-720) with KOH |

as described in Example 12 of EP 1 075 864 which explains that 2% by weight Cab-o-sil TS720 hydrophobic treated fumed silica was dispersed in 78% of the siloxane copolymer of Example 1 and 12% by weight of the MQ resin used in Example 1 dissolved in 8% octyl stearate was added, followed by 0.5% of a 20% aqueous KOH solution. The mixture was reacted at 80° C. for 6 hours then heated under vacuum at 140° C. for an hour to form silicone antifoam 2. The reaction promoted resin condensation and possibly some reaction of the resin with the silica.

Example 3

An antifoam composition was prepared in the same manner as described in Example 1, except that the silicone antifoam is replaced by silicone antifoam 3:

| | |
|---|---|
| 89% | polyorganosiloxane fluid |
| 8% | MQ resin |
| 2% | hydrophobised silica (Cab-o-sil ® TS-530) with KOH |

Silicone antifoam 3 is produced in the same way as silicone antifoam 2, except that the MQ resin is dispersed in the siloxane copolymer.

Comparative Example 1

An antifoam composition was prepared in the same manner as described in Example 1, except that the silicone antifoam was replaced with 30 wt % of branched PDMS antifoam compound. The branched PDMS antifoam compound used in this comparative example was prepared according to the method disclosed in Example 1 of U.S. Pat. No. 4,639,489. The amounts of ingredients used were as follows: 59.2 weight parts of a trimethylsiloxy-terminated polydimethylsiloxane having a viscosity of 1000 $mm^2/s$ at 25° C. 28.2 weight parts of a hydroxy-terminated polydimethylsiloxane having a viscosity of 12,500 $mm^2/s$ at 25° C., 2.8 weight parts of ethyl polysilicate ("Silicate 45" from Tama Kagaku Kogyo Co., Ltd., Japan), 1.3 weight parts of a potassium silanolate catalyst, 2.8 parts of Aerosil 200 Silica (silica having a surface area of 200 $m^2/g$ from Degussa-Huls Corporation), and 4.8 weight parts of hydroxy-terminated polydimethylsiloxane having a viscosity of 40 $mm^2/s$ at 25° C. In addition to the above ingredients, this formulation also included 0.625 weight parts of water, 0.005 weight parts of Silwet® L-77 Silicone Glycol and 0.09 weight parts of L-540 Silicone Glycol (a silicone polyether block copolymer wherein the polyether blocks consist of 50/50 mole percent of polyoxyethylene/polyoxypropylene) both from Momentive Performance Materials.

Comparative Example 2

Silicone antifoam 1 was used as such.

Comparative Example 3

Silicone antifoam 1 was emulsified with the following conventional emulsifying agents: stearyl alcohol ethoxylate (EO)2 and stearyl alcohol ethoxylate (EO)20 at 20% active in water.

Comparative Example 4

Trimethysiloxy-terminated PDMS fluid having a viscosity of 1000 $mm^2/s$ (Dow Corning 200 Fluid) was combined with 4% hydrophobic silica (Sipernat® D10)

Comparative Example 5

Silicone antifoam 3 was used as such.

Stability Tests

A visual stability test of the antifoam dispersion in HDL was performed by mixing 1% of the antifoam compositions and the detergent for 20 seconds using a Speedmixer at 3000 rpm. A model HDL system was used together with a number of commercially available HDL detergents. The model HDL detergent contained: 7% sodium lauryl ether sulfate (SLES), 7% dodecylbenzene sulfonate (LAS), 7% dehydol LT7, 5% sodium tripolyphosphate, 5% glycerine and water.

The antifoam/detergent compositions were then placed into a bottle. The bottle was kept in an oven at 37° C. and the aspect of the dispersion was visually monitored with time. The number of days before any sign of degradation appeared (e.g. a jelly-like ring on the glass bottle at the surface of the liquid or sedimentation) was recorded. The results are set out in the following tables.

TABLE 1

Results using the model HDL detergent

| Antifoam composition | Time at 37° C. before degradation observed visually (days) |
|---|---|
| Example 1 | 21 |
| Comparative Example 2 | 1 |
| Comparative Example 3 | 17 |
| Example 2 | 13 |
| Example 3 | >68 |
| Comparative Example 1 | 5 |
| Comparative Example 4 | 0 |
| Comparative Example 5 | 6 |

TABLE 2

Results using commercially available HDL detergents

| Antifoam composition | Time at 37° C. before degradation observed visually (days) | | | | |
|---|---|---|---|---|---|
| | Ecover "Lessive liquide" | W5 Formil Active Colours | Dixan Gel | Persil "Touch of Silan" | Dash "Liquid Detergent" |
| Comparative Example 1 | 12 | 12 | 9 | 9 | 23 |
| Example 1 | 11 | 21 | 21 | 21 | 28 |
| Example 2 | 13 | 13 | 13 | 31 | 16 |
| Example 3 | 24 | 31 | 68 | 39 | 39 |

Washing Machine Tests (Antifoam Performance)

1.7 kg loads of towels were washed using 60 g of the model HDL formulation together with 0.075% of the antifoam compositions described hereinabove. A Miele W934 front loading washing machine was loaded with the towels and charged with 13 L of soft water to which was added 12 mL of a 262 g/L $CaCl_2.2H_2O$ aqueous solution and 25 mL of a 72 g/L $MgCl_2.6H_2O$ aqueous solution.

The wash was performed using a 40° C. programme. The foam height profile during the washing cycle was recorded and the results are set out in FIG. 1. The FIGURE shows that the formulations of embodiments of the present invention show, in addition to improved stability, excellent antifoam properties (akin to the comparative formalities).

The invention claimed is:

1. A foam control composition comprising: (A) a silicone antifoam comprising (i) an organopolysiloxane having at least one silicon-bonded substituent of the formula X—Ar, wherein X represents a divalent aliphatic group bonded to silicon through a carbon atom and Ar represents an aromatic group, (ii) an organosilicon resin having the formula $R^1_a SiO_{(4-a)/2}$ where $R^1$ represents a hydrocarbon, a hydrocarbonoxy or a hydroxyl group and a has an average value of 0.5 to 2.4, and (iii) a hydrophobic filler; and (B) an organopolysiloxane resin having at least one polyoxyalkylene group in which the organopolysiloxane resin comprises tetrafunctional siloxane units having the formula $SiO_{4/2}$ and monofunctional siloxane units having the formula $R^2_3SiO_{1/2}$, wherein the total number of tetrafunctional siloxane units in the resin is at least 50% based on the total number of siloxane units, and $R^2$ represents a hydrocarbon group.

2. A foam control composition as claimed in claim 1 further comprising (C) a cross-linked organopolysiloxane polymer having at least one polyoxyalkylene group, in which the cross-linked organopolysiloxane polymer comprises difunctional siloxane units having the formula $R^3_2SiO_{2/2}$, wherein the total number of difunctional siloxane units is at least 60% based on the total number of siloxane units, and $R^3$ represents a hydrocarbon group.

3. A foam control composition as claimed in claim 1, further comprising (D) an organic oil.

4. A foam control composition as claimed in claim 1, wherein the total number of tetrafunctional siloxane units in the organopolysiloxane resin (B) is at least 70% based on the total number of siloxane units.

5. A foam control composition as claimed in claim 1, wherein the ratio of tetrafunctional siloxane units to monofunctional siloxane units in the organopolysiloxane resin (B) is 1:0.4-1.2.

6. A foam control composition as claimed in claim 2, wherein the total number of difunctional siloxane units in the cross-linked organopolysiloxane polymer (C) is at least 70% based on the total number of siloxane units.

7. A method of using the foam control composition as claimed in claim 1 for reducing or eliminating foam formation in a liquid.

8. A liquid detergent comprising one or more surfactants, water and the foam control composition as claimed in claim 1.

9. A liquid detergent as claimed in claim 8, wherein the detergent is an HDL detergent.

10. A liquid detergent as claimed in claim 8, wherein the foam control composition is present at 0.01-0.5% by weight based on the total weight of the detergent.

11. A foam control composition as claimed in claim 2, further comprising (D) an organic oil.

12. A foam control composition as claimed in claim 3 comprising 10-50% by weight of component (A), 0.1-5% by weight of component (B), and 40-90% by weight of component (D), based on the total weight of the foam control composition.

13. A foam control composition as claimed in claim 2, wherein the total number of tetrafunctional siloxane units in the organopolysiloxane resin (B) is at least 70% based on the total number of siloxane units.

14. A foam control composition as claimed in claim 2, wherein the ratio of tetrafunctional siloxane units to monofunctional siloxane units in the organopolysiloxane resin (B) is 1:0.4-1.2.

15. A method of using the foam control composition as claimed in claim 2 for reducing or eliminating foam formation in a liquid.

16. A method of using the foam control composition as claimed in claim 3 for reducing or eliminating foam formation in a liquid.

17. A liquid detergent comprising one or more surfactants, water and the foam control composition as claimed in claim 2.

18. A liquid detergent comprising one or more surfactants, water and the foam control composition as claimed in claim 3.

19. A liquid detergent as claimed in claim 17, wherein the foam control composition is present at 0.01-0.5% by weight based on the total weight of the detergent.

20. A foam control composition as claimed in claim 11 comprising 10-50% by weight of component (A), 0.1-5% by weight of component (B), 0.1-5% by weight of component (C) and 40-90% by weight of component (D), based on the total weight of the foam control composition.

* * * * *